United States Patent
Goto et al.

(10) Patent No.: US 9,852,334 B2
(45) Date of Patent: Dec. 26, 2017

(54) METHOD AND APPARATUS FOR DETECTING MOVING OBJECTS

(71) Applicant: DENSO CORPORATION, Kariya, Aichi-pref. (JP)

(72) Inventors: Kunihiro Goto, Kariya (JP); Ikuro Sato, Yokohama (JP)

(73) Assignee: DENSO CORPORATION, Nagoya-shi (JP)

( * ) Notice: Subject to any disclaimer, the term of this patent is extended or adjusted under 35 U.S.C. 154(b) by 651 days.

(21) Appl. No.: 14/104,060

(22) Filed: Dec. 12, 2013

(65) Prior Publication Data

US 2014/0168431 A1   Jun. 19, 2014

(30) Foreign Application Priority Data

Dec. 13, 2012  (JP) ................................ 2012-272455
Jul. 5, 2013  (JP) ................................ 2013-141690

(51) Int. Cl.
   *G06K 9/00*   (2006.01)
   *G06K 9/62*   (2006.01)

(52) U.S. Cl.
   CPC ..... *G06K 9/00369* (2013.01); *G06K 9/00342* (2013.01); *G06K 9/00805* (2013.01); *G06K 9/6255* (2013.01)

(58) Field of Classification Search
   CPC ........ H04N 7/18; B60R 1/00; G06K 9/00369; G06K 9/00342; G06K 9/00805; G06K 9/6255
   USPC ........ 348/435, 901; 340/435, 901; 382/103, 382/170
   See application file for complete search history.

(56) References Cited

U.S. PATENT DOCUMENTS 7,227,893 B1 * 6/2007 Srinivasa ........... G06K 9/00771
                                          348/155
7,853,072 B2 * 12/2010 Han .................... G06K 9/4642
                                          382/103

(Continued)

FOREIGN PATENT DOCUMENTS

JP   2009-157581   7/2009
JP   2009-294842   12/2009

(Continued)

*Primary Examiner* — Mishawn Hunter
(74) *Attorney, Agent, or Firm* — Harness, Dickey & Pierce, P.L.C.

(57) ABSTRACT

An apparatus for detecting a moving object is provided. In the apparels, a moving object, such as a pedestrian, is imaged repeatedly. As a dictionary, image patterns indicative of features of the moving object are stored in a storage in advance. Feature points indicating a position of an object in the images are extracted based on the images. An optical flow of the feature points is calculated based on the features points. The feature points are grouped and a reference rectangle encompassing the grouped feature points is set, based on the optical flow. An identification region encompassing a region showing the moving object is set, the identification region encompassing the reference rectangle. The moving object is identified in the identification region, using the dictionaries. The region of the moving object is specified, based on identified results and an image region having the highest degree of match with the dictionaries.

2 Claims, 17 Drawing Sheets

(56) References Cited

U.S. PATENT DOCUMENTS

| | | | | |
|---|---|---|---|---|
| 8,570,188 | B2* | 10/2013 | Yamashita | B60R 1/00 340/435 |
| 2004/0234136 | A1* | 11/2004 | Zhu | G06K 9/3241 382/224 |
| 2005/0232466 | A1* | 10/2005 | Kampchen | G06T 7/2046 382/103 |
| 2005/0280657 | A1* | 12/2005 | Hori | G06T 7/251 345/619 |
| 2007/0223785 | A1 | 9/2007 | Sano | |
| 2009/0237269 | A1* | 9/2009 | Okugi | B60R 1/00 340/901 |
| 2011/0135159 | A1* | 6/2011 | Uchida | G06T 7/269 382/107 |
| 2013/0094759 | A1* | 4/2013 | Yagi | G06K 9/00369 382/170 |
| 2013/0194419 | A1* | 8/2013 | Bhowmick | G06T 7/0022 348/142 |
| 2014/0225723 | A1* | 8/2014 | Sobue | B60R 1/00 340/435 |

FOREIGN PATENT DOCUMENTS

| | | |
|---|---|---|
| JP | 2010-128919 A | 6/2010 |
| JP | 2013-069045 A | 4/2013 |

\* cited by examiner

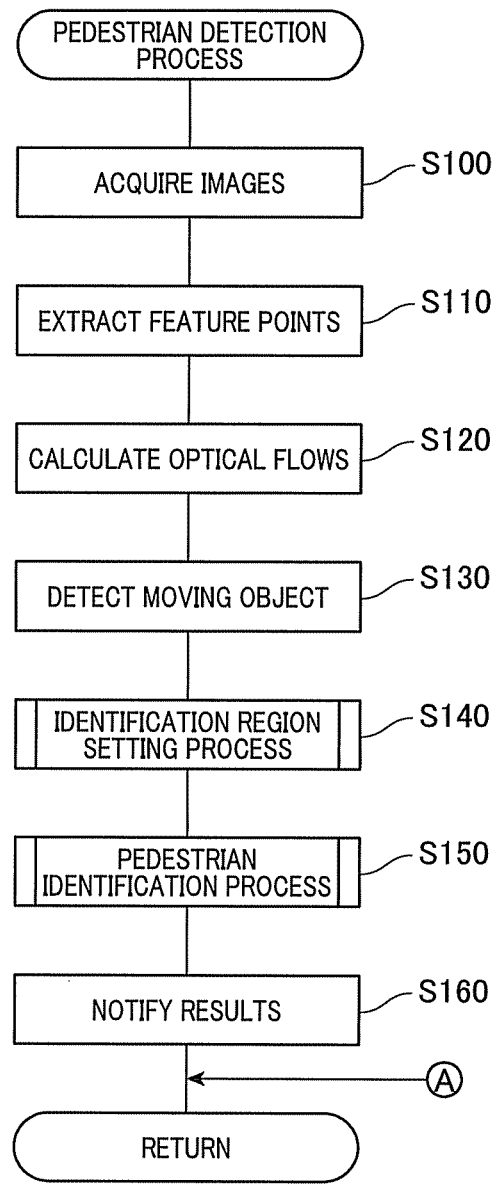

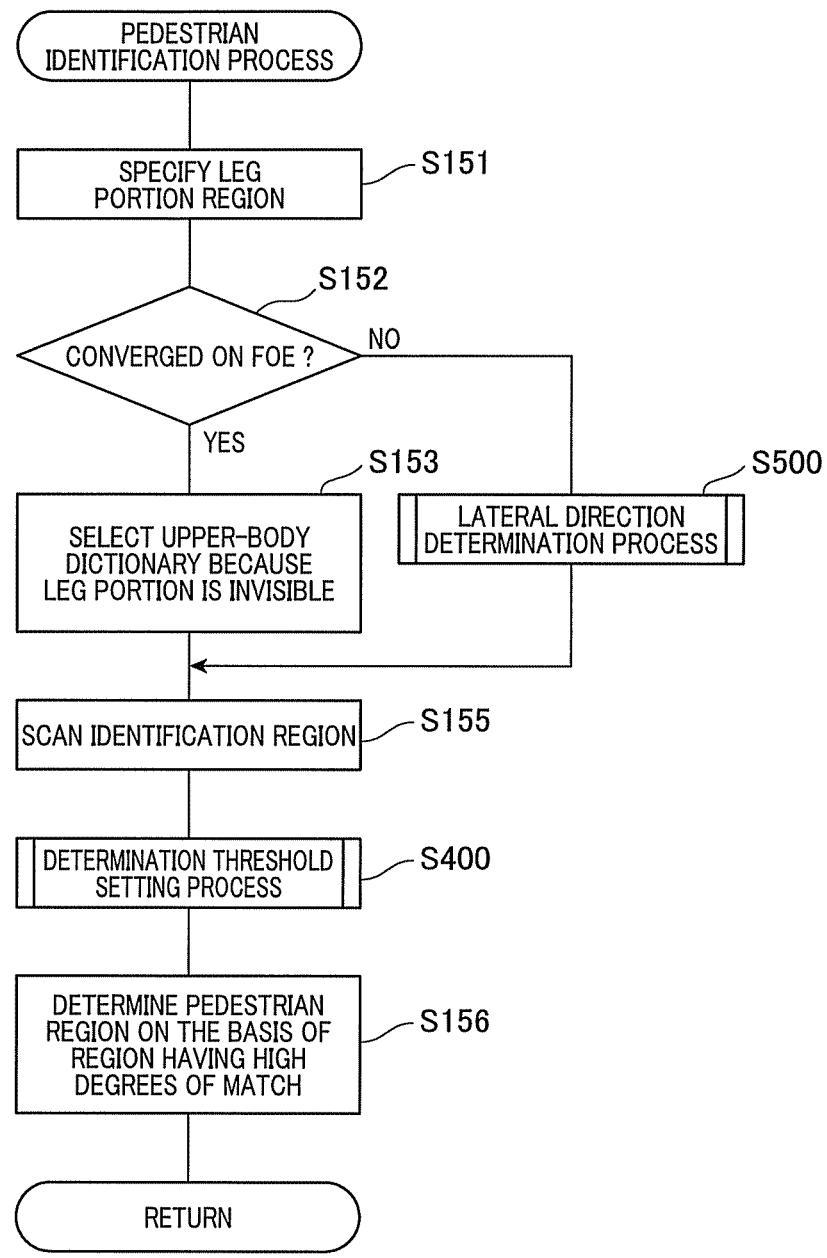

METHOD AND APPARATUS FOR DETECTING MOVING OBJECTS

CROSS-REFERENCE TO RELATED APPLICATION

This application is based on and claims the benefit of priorities from earlier Japanese Patent Application Nos. 2012-272455 and 2013-141690 filed Dec. 13, 2012 and Jul. 5, 2013, respectively, the descriptions of which are incorporated herein by reference.

BACKGROUND OF THE INVENTION

Technical Field

The present invention relates to a moving object detection apparatus that detects a moving object, such as a pedestrian, on the basis of picked up images.

Related Art

Techniques for detecting a moving object, such as a pedestrian, from the images picked by a camera or the like have been suggested. Some of such techniques make use of optical flows. Optical flows express the movement of an object in terms of vectors in the images obtained in time series by a camera or the like.

Specifically, in such a technique, feature points are extracted from an image and the positions of the feature points are specified in time-series images to obtain motion vectors of the individual feature points. In the present specification, a motion vector is referred to as "an optical flow".

For example, a patent document JP-A-2009-157581 suggests a pedestrian detection apparatus that uses such optical flows for the detection of pedestrians. In this apparatus, a region in which optical flows have been detected is specified as a moving-object region. Then, a lower region having a size suitable for the size of the moving-body region is set below the moving-object region. It is then determined whether or not the lower region corresponds to a leg portion of a pedestrian, followed by specifying a whole-body region of the pedestrian.

However, if the region in which the optical flows have got together is immediately specified to be a moving-body region, noise included in the optical flows may induce erroneous detection of a moving body. Also, in determining whether or not a lower region corresponds to a leg portion, if the lower region is located behind a parked vehicle or the like, the lower region will not be necessarily determined to be a leg portion. Accordingly, if the leg portion of a pedestrian is invisible in an image (i.e., the leg portion is behind other objects), there is a concern that the pedestrian will not be necessarily detected, which may cause a dangerous situation.

SUMMARY

Thus it is desired to provide a moving object detection apparatus which is able to reliably detect a moving object in a situation where a part of a moving body is invisible in an image.

In a moving object detection apparatus provided to achieve the above object, an imaging unit repeatedly picks up images of a region targeted for detection of a moving object. For example, the imaging unit is provided in the form of a monocular camera that picks up images in the forward direction of the vehicle that installs the object detection apparatus. Taking account of the travel of the vehicle, it would be practical to pick up images in the forward direction of the vehicle. However, as a matter of course, this shall not impose a limitation.

A dictionary storage previously stores image patterns in the form of a dictionary, the image patterns corresponding to features of a moving object. This dictionary includes several thousands of image data items. Image scan is performed using the dictionary to identify a moving object.

In this case, an extracting section extracts feature points that show the location of an object in image, on the basis of the images repeatedly picked up by the imaging unit. For example, each of the feature points may be extracted as a point where the tangential direction drastically changes, the point residing in a contour of an object or the like detected on the basis of the differences in luminance in image.

A calculating section calculates an optical flow of each feature point on the basis the feature point in question in time-series images extracted by the extracting section. As mentioned above, an optical flow is a motion vector of a feature point and has a direction and a length in image.

In the present disclosure in particular, a rectangle setting section groups together the feature points in a moving object and sets a reference rectangle that includes the grouped feature points, on the basis of the optical flows calculated by the calculating section. The optical flows of the feature points in a moving object will converge in the vicinity of a vanishing point that corresponds to the moving object. Therefore, the feature points whose optical flows converge in the vicinity of a vanishing point are grouped together.

A region setting section sets an identification region that encompasses a reference rectangle which is set by the rectangle setting section. The identification region encompasses the region of a moving object. The expression "encompasses a reference rectangle" refers to that, taking account of the probability for a moving object to spread out of the reference rectangle, an identification region larger than the reference rectangle is set. The expression also includes the case where the size of an identification region is the same as that of the reference rectangle.

In contrast, an identifying section identifies a moving object, using a dictionary stored in the dictionary storage, with respect to an identification region set by the region setting section. In other words, in a sense of preventing erroneous detection of a moving object, an identification region is scanned using a dictionary for the identification of a moving object.

As a result of the identification conducted by the identifying section, a specifying section specifies the region of a moving object on the basis of an image region in which the degrees of match with a dictionary are high.

In this way, in the present embodiment, an identification region encompassing a moving object is set, and the moving object is ensured to be identified with respect to the identification region, using a dictionary that shows the features of the moving object. Thus, in the event that a part of a moving object is invisible in image due to the fact that the part is behind other objects, the moving object can be reliably detected.

In detecting a pedestrian as a moving object, the advantageous effects of the present disclosure are remarkable in the case where, for example, the leg portion of the pedestrian is invisible in the image. In this regard, some embodiments will be described below, using examples in which a pedestrian is a moving object. As a matter of course, the application of the present disclosure is not limited to pedestrians, and can be applied to the detection of other moving objects, such as vehicles or animals.

BRIEF DESCRIPTION OF THE DRAWINGS

In the accompanying drawings:

FIG. 2 is a flow diagram illustrating a pedestrian detection process performed by the apparatus;

FIG. 14 is a flow diagram illustrating a pedestrian identification process, according to the second embodiment;

DETAILED DESCRIPTION OF THE PREFERRED EMBODIMENTS

With reference to the accompanying drawings, hereinafter are described some embodiments of the present invention.

First Embodiment

Figure 1:
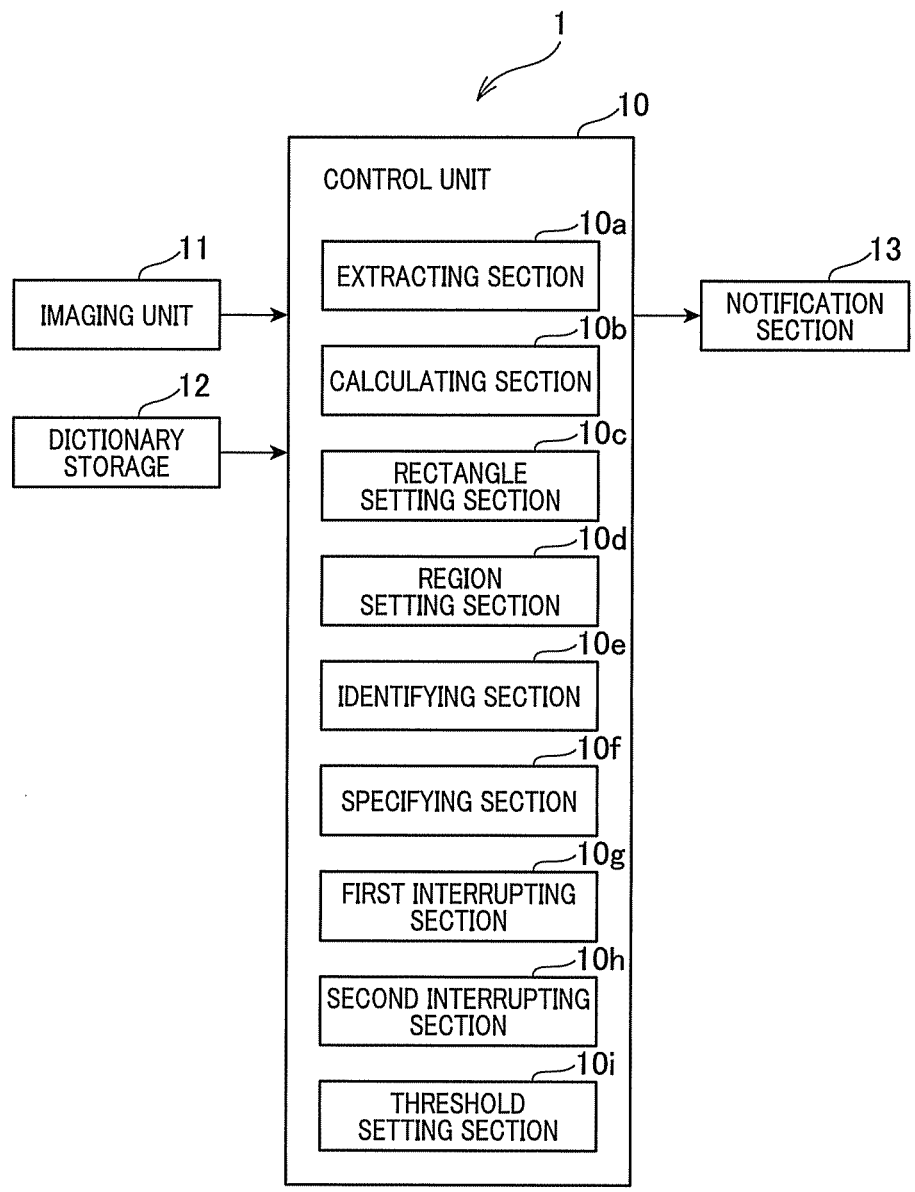
FIG. 1 is a schematic block diagram illustrating a pedestrian detection apparatus, according to a first embodiment and the other embodiments of the present invention.

FIG. 1 is a schematic block diagram illustrating a pedestrian detection apparatus 1. The pedestrian detection apparatus 1 is chiefly configured by a control unit 10. The control unit 10 is connected to an imaging unit 11, a dictionary storage 12 and a notification section 13.

The control unit 10 is a computer which includes a CPU, a ROM, a RAM, an I/O and a bus line that connects these components. As will be described later, the control unit 10 performs a pedestrian detection process.

The imaging unit 11 is configured by a monocular camera for picking up images in the forward direction of the vehicle equipped with the pedestrian detection apparatus 1, and a buffer that stores the images picked up by the monocular camera. The monocular camera picks up repeatedly, at intervals, images in the forward direction of the own vehicle while the vehicle travels. The picked up images are stored in the buffer as time-series images. In the pedestrian detection process described later, the control unit 10 acquires a plurality of images from the buffer. The monocular camera is mounted in the vicinity of a rearview mirror.

The dictionary storage 12 is provided in the form such as of an HDD (hard disk drive). As a matter of course, other than the HDD, a DVD-ROM or a CD-ROM may be used as the dictionary storage 12. The dictionary storage 12 stores pedestrian dictionaries which have been prepared by extracting feature quantities from several thousands of pedestrian/non-pedestrian images used for learning, and by using a learning method such as SVM (support vector machine) learning. In the present embodiment, the dictionary storage 12 previously stores therein a whole-body dictionary in which a whole body of a pedestrian is patterned, an upper-body dictionary in which an upper body of a pedestrian is patterned, and a lateral-half-body dictionary in which a lateral half body of a pedestrian is patterned.

The notification section 13 is configured to give a notification on the basis of the results of detection in the case where a pedestrian has been detected through the pedestrian detection process performed by the control unit 10. Specifically, the notification section 13 is provided in the form of a speaker or a display.

Referring to FIG. 2, the pedestrian detection process is described. The pedestrian detection process is repeatedly performed by the control unit 10 while the own vehicle travels.

At step S100, first, images are acquired. At this step, the control unit 10 acquires a plurality of images from the buffer of the imaging unit 11, which have been picked up by the monocular camera. For example, the control unit 10 acquires two time-series images. Description here is provided assuming that the control unit 10 has acquired an image at time t and an image at time (t+Δt) after lapse of time Δt.

At the subsequent step S110, feature points are extracted. At this stage, the control unit 10 extracts feature points from the images. The method of extracting feature points are not particularly limited but such a method may be used as specifying a contour of an object on the basis of differences in luminance in an image, and extracting points, as feature points, in each of which the tangential direction of the contour has changed to a large extent.

At step S120, an optical flow is calculated. At this step, the control unit 10 calculates the movement of the feature points extracted at step S110. Specifically, the control unit 10 calculates an optical vector, as an optical flow, which is indicated by length, in image, between the feature point at time t and the feature point at time (t+Δt) and by direction.

At step S130, a moving object is detected. At this step, the control unit 10 groups together the feature points which exhibit a similar movement, and extracts the feature points that indicate a moving object, from among the feature points that have been grouped. The optical flow that expresses a feature point of a stationary object, when the optical flow is extended straight along its direction, will pass through an FOE (focus of expansion) (converge on the FOE). On the other hand, it is well known that the optical flow that expresses a feature point of a moving object is directed toward the vicinity of a vanishing point that corresponds to the moving object. Accordingly, the feature points configuring those optical flows which do not converge on the FOE indicate a moving object. Also, the control unit 10 groups together the feature points whose optical flows are directed toward the vicinity of the vanishing point, although there may be a little variation in the optical flows.

For ease of understanding of steps S100 to S130, the following description is provided, using a specific example.

Figure 3A:
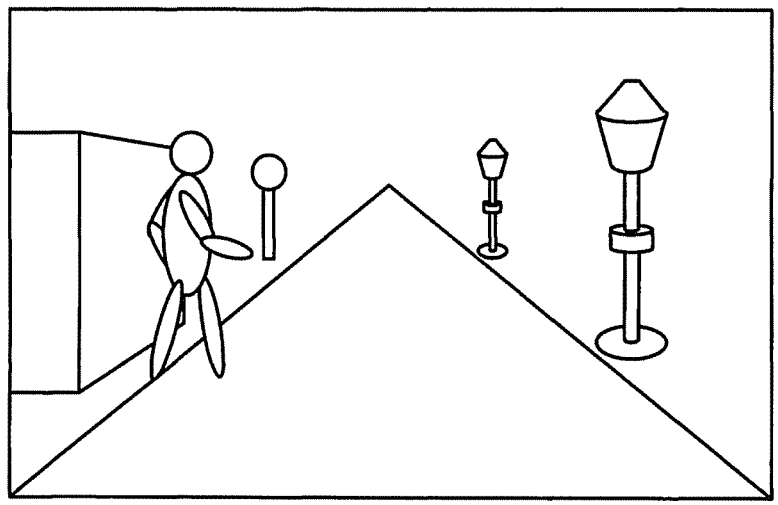
FIGS. 3A and 3B are explanatory views each illustrating a first half of the pedestrian detection process.
Figure 3B:
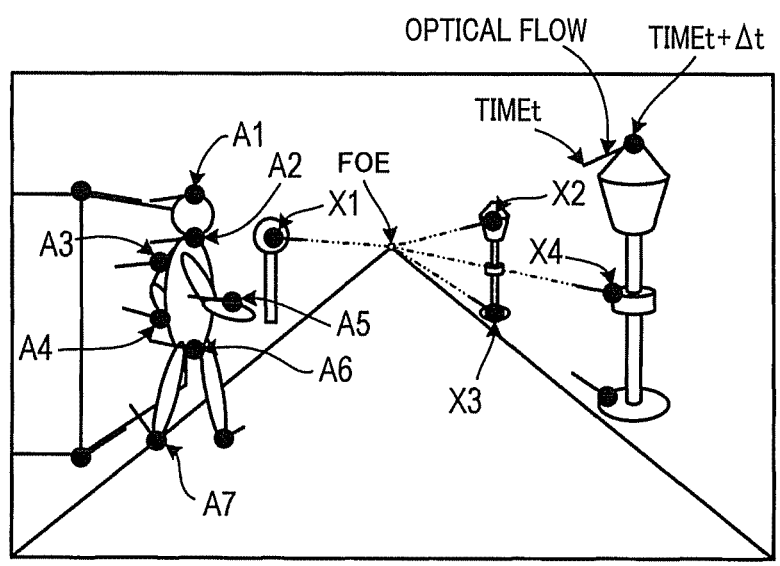

For example, an image as shown in FIG. 3A is acquired (step S100 of FIG. 2). This is an image at time (t+Δt). Using this image, the control unit 10 extracts feature points (step S110) and calculates respective optical flows (step S120) as shown in FIG. 3B. In FIG. 3B, the feature points at time (t+Δt) are schematically shown by black circles. The lines originated from the feature points are optical flows.

As shown in FIG. 3B, the optical flows such as of feature points X1, X2, X3 and X4 expressing stationary objects converge on the FOE when the optical flows are extended straight along their directions. The feature points of a moving object converge in the vicinity of a vanishing point (not shown) that corresponds to the moving object. Thus, the moving object is expressed by a group of feature points A1, A2, A3, A4, A5, A6 and A7 which configure the optical flows that do not converge on the FOE but converge in the vicinity of the vanishing point.

Referring to FIG. 2 again, at step S140, an identification region setting process is performed. At this step, the control unit 10 sets an identification range that encompasses the region of a moving object.

At step S150, a pedestrian identification process is performed. In the pedestrian identification process, the control unit 10 uses a pedestrian dictionary stored in the dictionary storage 12 of FIG. 1 to scan the identification region that has been set at step S140 and identify a pedestrian.

At step S160, results are notified. At this step, the control unit 10 notifies via the notification section 13 of FIG. 1 that a pedestrian has been detected. For example, when the notification section 13 is configured by a speaker, the control unit 10 notifies detection of a pedestrian via the speaker. For example, when the notification section 13 is configured by a display, the control unit 10 displays an image in the forward direction of the vehicle and superimposes the pedestrian region over the image.

Figure 4:
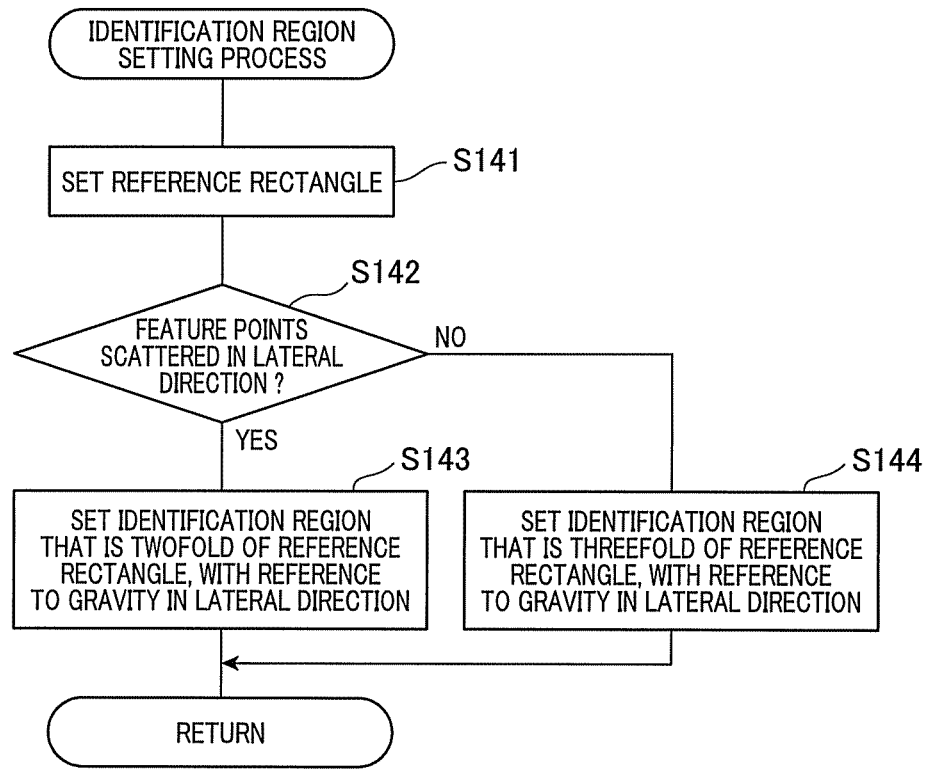
FIG. 4 is a flow diagram specifically illustrating an identification region setting process in the pedestrian detection process.

Referring to the flow diagram shown in FIG. 4, the identification region setting process performed at step S140 is specifically described.

First, at step S141, a reference rectangle is set. At this step, the control unit 10 sets a rectangular range that indicates the region of a moving object, with respect to the feature points that have been grouped as indicating the moving object. Here, the moving object is supposed to be a pedestrian and a reference rectangle suitable for a pedestrian is set.

Specifically, for example, assuming that the pedestrian is 180 cm tall, the control unit calculates a distance to the grouped feature points to determine the height of the reference rectangle. Then, the control unit 10 calculates in an image a vertical coordinate (Y coordinate) of a foot portion of the pedestrian. For the reasons provided below, the Y coordinate of the foot portion of the pedestrian is determined on the basis of the height of the pedestrian. Specifically, the optical flow in the leg portion of a pedestrian has a high probability of being split and may be grouped separately. Also, for example, when the leg portion of a pedestrian is located behind a parked vehicle as well, the leg portion behind the vehicle may be grouped separately. Therefore, when a distance to the feature points is used for determining the height of the reference rectangle, the height of the reference rectangle can be appropriately determined, in the event that no feature points indicating the leg portion of a pedestrian are available. In this case, the width of the reference rectangle is determined to be half of the height.

At step S142, it is determined whether or not the feature points included in the reference rectangle are scattered in the lateral direction (X direction). This determination is made by calculating a maximum width in the lateral direction of the plurality of feature points and comparing the maximum width with a predetermined threshold. This determination is made, taking account of the probability of detecting feature points only from the lateral half body of a pedestrian. Specifically, if the object is a pedestrian, the object will have a width of some extent in the lateral direction in conformity with the direction as can be recognized in image. Accordingly, when the width in the lateral direction is smaller than a set threshold, there is a high probability that the feature points are detected from only the lateral half body of a pedestrian. For example, one side of a pedestrian's contour may be invisible due to the fact that the one side is behind other objects, being located behind a building or the like. In preparation for such a case, a plurality of thresholds are set in advance according to the distance to the grouped feature points. If the feature points are determined to be scattered (YES at step S142), control proceeds to step S143. On the other hand, if the feature points are determined not to be scattered (NO at step s142), control proceeds to step S144.

At step S143, with reference to the gravity of the feature points in the lateral direction, the control unit 10 sets an identification region that has a width larger than that of the reference rectangle by a factor of two. The height of the identification region is set with a fixed margin being provided in the vertical direction of the reference rectangle.

At step S144, with reference to the gravity of the feature points in the lateral direction, the control unit 10 sets an identification region that has a width larger than that of the reference rectangle by a factor of three. Similar to step S143, the height of the identification region is set with a fixed margin being provided in the vertical direction of the reference rectangle.

At steps 143 and 144, the width of an identification region has been determined to be twofold or threefold of that of the reference rectangle. This is based on an idea that the width of an identification region is set to a larger value in the case where the scattering of feature points is smaller than a threshold. As far as this idea is satisfied, the width does not necessarily have to be set twofold or threefold.

For ease of understanding of the identification region setting process, the following description is provided, using a specific example.

Figure 5A:
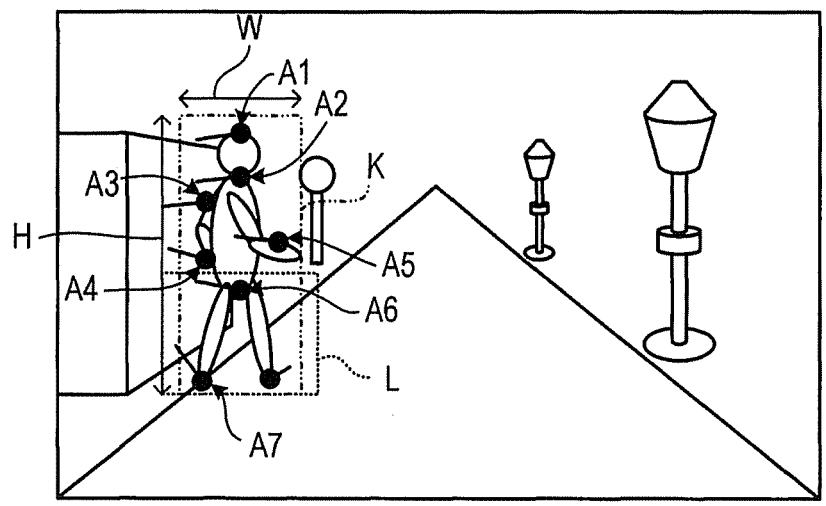
FIGS. 5A and 5B are explanatory views each illustrating how a reference rectangle is set in the identification region setting process.
Figure 5B:
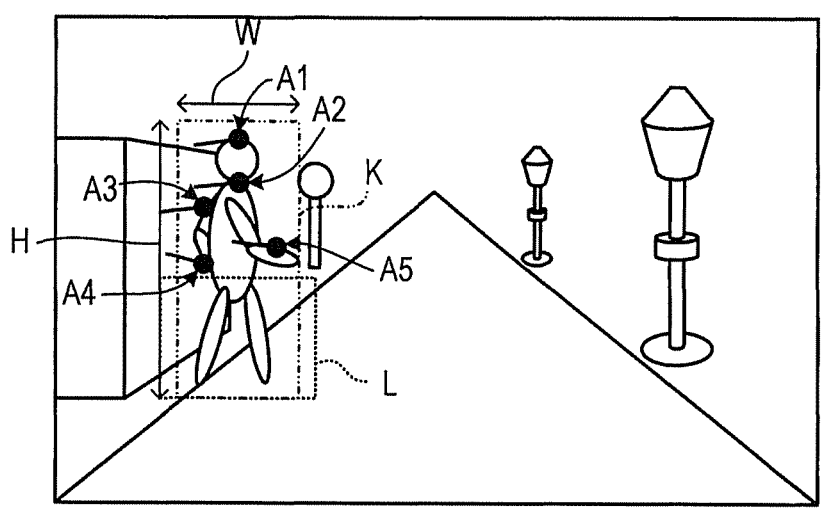

In FIG. 5A, the feature points A1 to A7 considered to indicate a moving object are grouped. In this case, a reference rectangle K is set for the feature points A1 to A7 (step S141 of FIG. 4). Specifically, a distance to the feature points A1 to A7 is calculated first. This distance may be an average value of the distances to the individual feature points A1 to A7, or may be an intermediate value of the distances. For example, an average value of the distances to the feature points A1 to A7 is calculated as being 10.5 m. Assuming that the pedestrian is 180 cm tall, a height H of the reference rectangle K in image is determined, for the distance to the moving object. Here, based on the distance to the moving object and camera parameters, such as a depression angle and a focal distance, the control unit 10 calculates a Y coordinate of the foot portion in image. A width W of the reference rectangle K is determined to be a half of the height H. Thus, a similar reference rectangle K can be obtained in the case where the feature points A6 and A7 corresponding to the foot region of the pedestrian are separately grouped and the reference rectangle K is determined, as shown in FIG. 5B, on the basis of the feature points A1 to A5. The reason why the pedestrian is assumed to be 180 cm tall is to ensure a sufficient height. As a matter of course, a different value, such as an average body height of adult males, may be used, or a plurality of body heights may be used to set a plurality of reference rectangles. The width W does not have to be necessarily set to a half of the height H, but may only have to be determined on the basis of the height H.

Then, the control units 10 determines whether or not the feature points A1 to A7 included in the reference rectangle K are scattered in the lateral direction (X direction) (step S142 of FIG. 4).

Figure 6A:
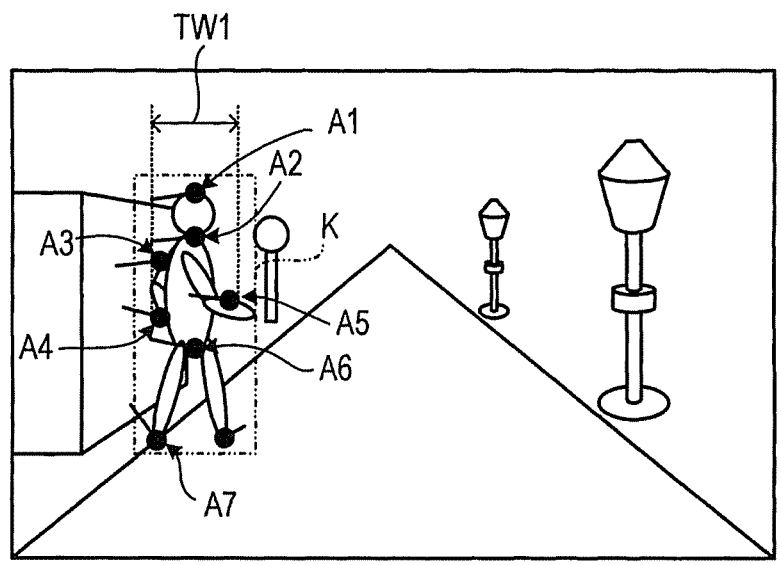
FIGS. 6A and 6B are explanatory views each illustrating how an identification region is set in the identification region setting process.
Figure 6B:
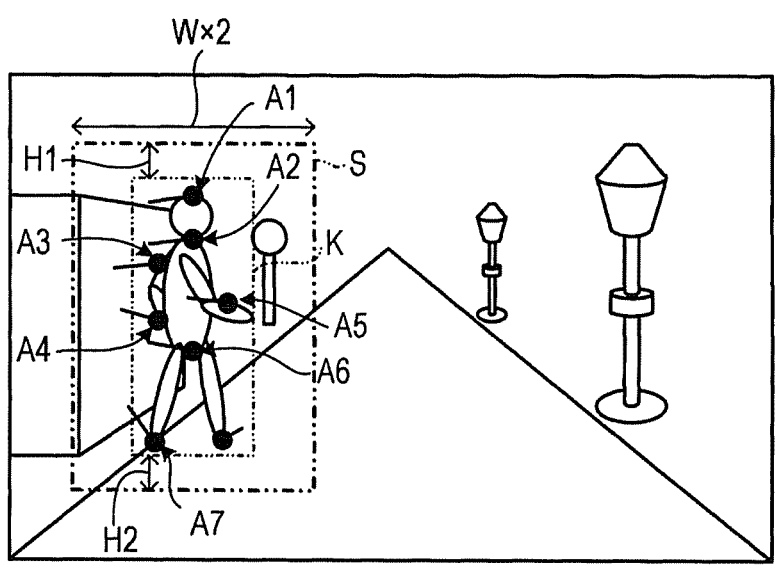

As shown in FIG. 6A, the control unit 10 calculates a maximum width TW1 of the feature points A1 to A7 in the lateral direction and compares the maximum width TW1 with a predetermined threshold. As described above, a plurality of thresholds according to the distance to the feature points A1 to A7 are set in advance. In this case, if the maximum width TW1 is equal to or larger than a threshold (YES at step S142), the control unit 10 sets, as shown in FIG. 6B, an identification region S having a width larger than that of the reference rectangle K by a factor of two (W×2), with reference to the gravity of the feature points A1 to A7 in the lateral direction. The height of the identification region S is set with fixed margins H1 and H2 being provided on the upper and lower sides, respectively, of the reference rectangle K. The identification region S is set here with reference to the gravity of the feature points A1 to A7 in the lateral direction. However, the identification region S may be set with reference to the center of the reference rectangle K.

Figure 7A:
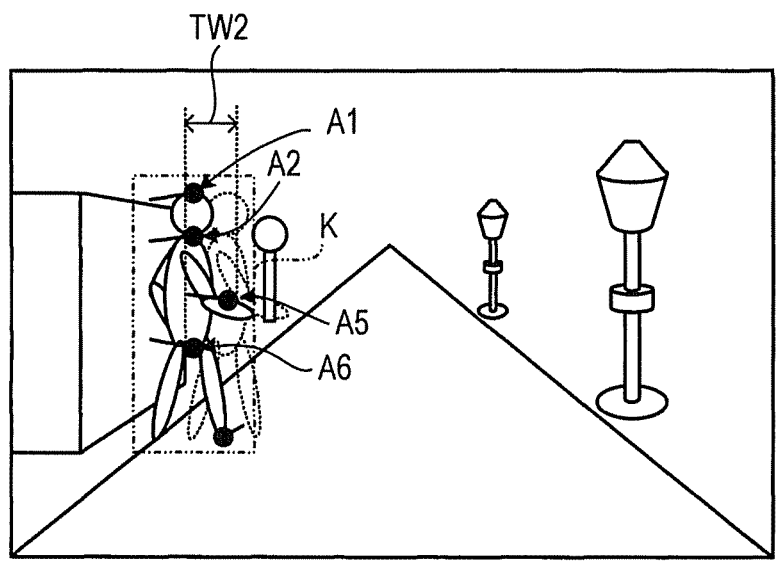
FIGS. 7A and 7B are explanatory views each illustrating how an identification region is set in the identification region setting process.
Figure 7B:
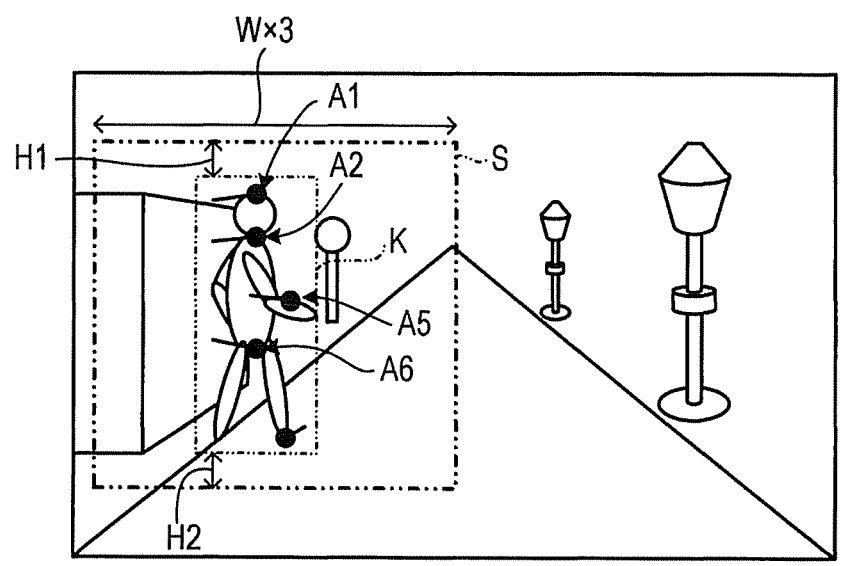

On the other hand, as shown in FIG. 7A, the control unit 10 may calculate a maximum width TW2 of the feature points A1, A2, A5 and A6 in the lateral direction and compare the maximum width TW2 with a predetermined threshold. When the result of the comparison shows that the maximum width TW2 is smaller than the threshold (NO at step S142), the control unit 10 sets, as shown in FIG. 7B, an identification region S having a width larger than that of the reference rectangle by a factor of three (W×3), with reference to the gravity of the feature points A1, A2, A5 and A6 in the lateral direction. This is because, in such a case, there is a probability that the feature points have been detected only from the lateral half body of a pedestrian, and the pedestrian may be located at the position indicated by the broken line. The height is set with margins H1 and H2 being provided on the upper and lower sides, respectively, of the reference rectangle K. The identification region S here is set with reference to the gravity of the feature points A1, A2, A5 and A6 in the lateral direction. However, the identification region S may be set with reference to the center of the reference rectangle K.

Figure 8:
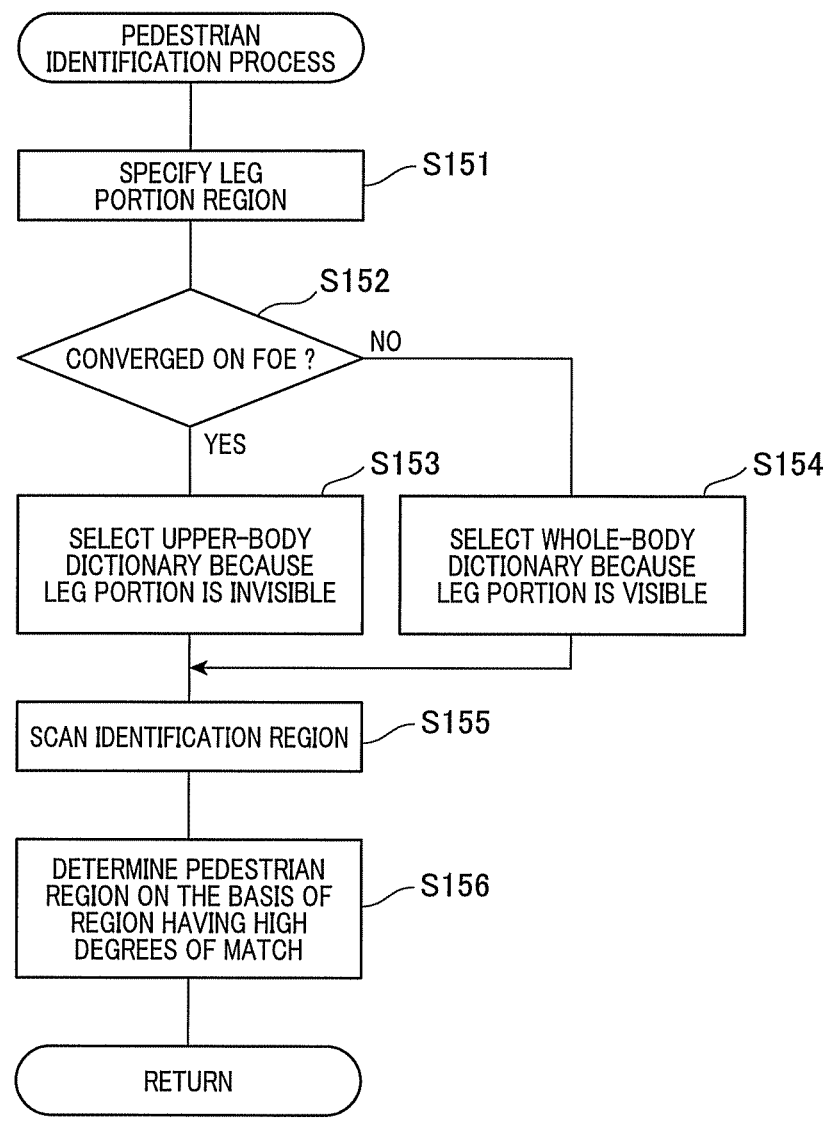
FIG. 8 is a flow diagram specifically illustrating a pedestrian identification process in the pedestrian detection process.

Referring now to the flow diagram shown in FIG. 8, hereinafter is described the pedestrian identification process performed at step S150 of FIG. 2.

First, at step S151, a leg portion region of a pedestrian is specified. At this step, the control unit 10 specifies a leg portion region on the basis of the reference rectangle set at step S141 of FIG. 4. As shown in FIGS. 5A and 5B, a Y coordinate of a foot portion is determined from the body height of the pedestrian. Accordingly, a leg portion region L can be specified with reference to the Y coordinate.

At step S152, it is determined whether or not the optical flows of the feature points in the leg portion region converge on the FOE. At this step, the control unit 10 determines whether or not the leg portion region specified at step S151 is invisible in image, being located behind a parked vehicle or the like. Specifically, if the leg portion region is invisible, being located behind a stationary object, the feature points corresponding to the leg portion region are of the stationary object. Accordingly, the optical flows of the feature points in the leg portion region converge on the FOE.

Figure 9A:
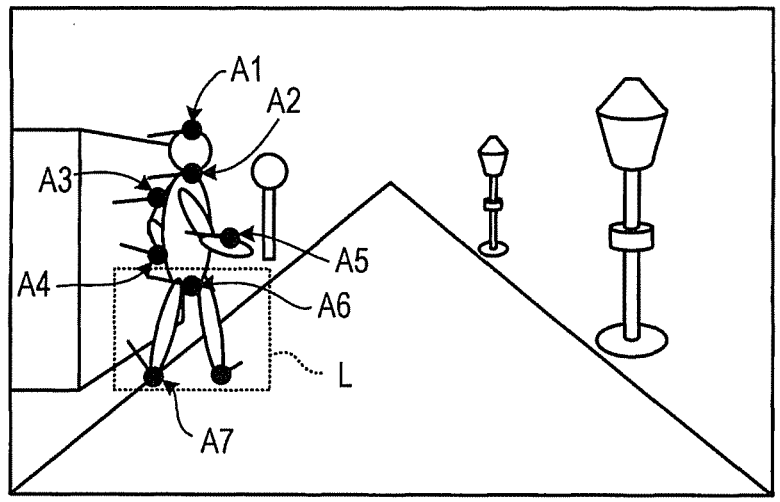
FIGS. 9A and 9B are explanatory views each illustrating selection of a dictionary in the pedestrian detection process.
Figure 9B:
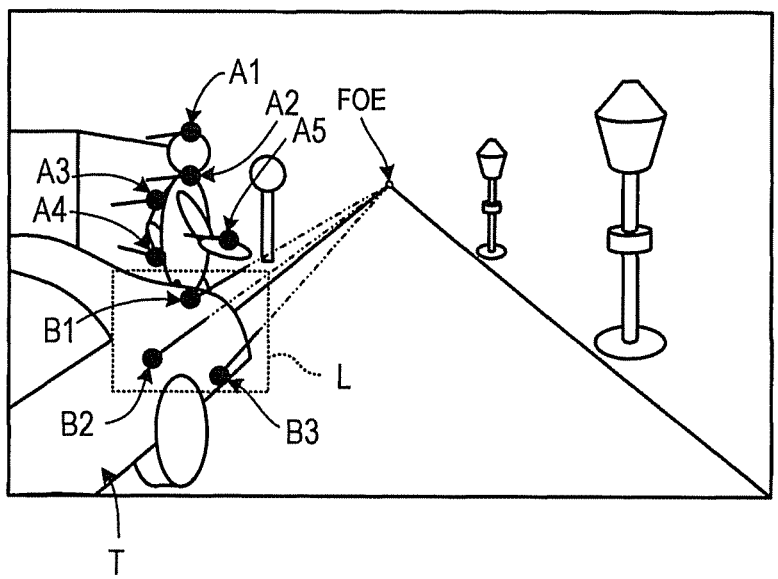

For example, as shown in FIG. 9A, when the feature points A6 and A7 corresponding to the leg portion region L are visible in image, the feature points A6 and A7 of the leg portion region L do not converge on the FOE. In contrast, as shown in FIG. 9B, when the leg portion region L is invisible, being located behind a parked vehicle T, for example, feature points B1, B2 and B3 in the leg portion region L are of the parked vehicle T that is a stationary object. Therefore, as shown by the dash-dot-dot line in FIG. 9B, the optical flows converge on the FOE.

At step S152, if the optical flows of the feature points in the leg portion region are determined to converge on the FOE (YES at step S152), the control unit 10 determines, at step S153, that the leg portion is invisible and selects the upper-body dictionary. Then, control proceeds to step S155. On the other hand, if the optical flows of the feature points in the leg portion region are determined not to converge on the FOE (NO at step S152), the control unit 10 determines, at step S154, that the leg portion is visible and selects the whole-body dictionary. Then, control proceeds to step S155.

At step S155, the identification region is scanned. At this step, the control unit 10 performs matching, using the dictionary selected at step S153 or S154. Specifically, the control unit 10 scans the inside of the identification region and calculates the degree of match for each of positions.

At the subsequent step S156, the control unit 10 determines a pedestrian region on the basis of a region in which the degree of match is high. Then, the pedestrian identification process is halted until the next iteration. At step S156, the control unit 10 compares a predetermined determination, threshold with each degree of match and determines a region in which the degrees of match exceed the determination threshold, as being a pedestrian region.

As described in detail in the above, in the present embodiment, the control unit 10 acquires images which are repeatedly picked up in the imaging unit 11 (step S100 of FIG. 2), extracts feature points in the images (step S100), and calculates an optical flow for each of the feature points (step S120). After that, the control unit 10 groups together feature points on the basis of the optical flows (step S130), followed by setting a reference rectangle, and then sets an identification region that encompasses the reference rectangle (step S140). Then, the control unit 10 scans the set identification region using a dictionary stored in the dictionary storage 12 to thereby determine a pedestrian region (step S150).

Specifically, the pedestrian detection apparatus 1 includes: the imaging unit 11 that repeatedly picks up images of a region which is targeted for detection of a moving object; a dictionary storage 12 that stores image patterns, as dictionaries, corresponding to the features of a moving object; an extracting section 10a that detects feature points which indicate the location of an object in image, on the basis of the images repeatedly picked up by the imaging unit 11; a calculating section 10b that calculates an optical flow for each of the feature points, on the basis of the feature points in time-series images extracted by the extracting section 10a; a rectangle setting section 10c that groups together the feature points in a moving object and sets a reference rectangle that encompasses the grouped feature points; a region setting section 10d that sets an identification region encompassing the reference rectangle that has been set by the rectangle setting section 10c, i.e. an identification region that encompasses the region of a moving object; an identifying section 10e that identifies a moving object, using a dictionary stored in the dictionary storage 12, with respect to the identification region that has been set by the region setting section 10d; and a specifying section 10f that specifies the region of a moving object on the basis of an image region having high degrees of match with the dictionary, as a result of the identification performed by the identifying section 10e.

Among the above elements, as shown in FIG. 1, the extracting section 10a, the calculating section 10b, the rectangle setting section 10c, the region setting section 10d, the identifying section 10e, and the specifying section 10f are functionally realized by the control unit 10 through performance of the processes shown in FIG. 2.

More specifically, the control unit 10 is ensured to set an identification region that encompasses a pedestrian as a moving object and to identify a pedestrian with respect to the identification region, using a dictionary that shows features of a pedestrian. With this configuration, in the event that a part of a pedestrian is invisible in the image, the pedestrian can be reliably detected.

In the present embodiment, a reference rectangle that indicates the region of a moving object is set with respect to the feature points that are grouped together as showing the moving object. On the premise that the moving object is a pedestrian, a reference rectangle suitable for a pedestrian is set (step S141 of FIG. 3).

Specifically, for example, assuming that a pedestrian is 180 cm tall, the control unit 10 calculates a distance to grouped feature points and determines the height of a reference rectangle. Then, the control unit 10 calculates in the image a vertical coordinate (Y coordinate) of the foot portion of the pedestrian. In other words, the rectangle setting section 10c determines the height of the reference rectangle on the basis of the distance to the grouped feature points and the height of the virtually set moving object. Thus, in the event that the upper and lower portions of a moving object are invisible in the image, i.e. here, in the event that the leg portion of the pedestrian is invisible in the image, a reference rectangle having an appropriate height can be set.

In this case, in the present embodiment, the width of the reference rectangle is set to a half of its height. In other words, the rectangle setting section 10c determines the width of the reference rectangle on the basis of the height of the reference rectangle. Thus, a reference rectangle having an appropriate width can be comparatively easily set.

Further, in the present embodiment, it is determined whether or not the feature points included in the reference rectangle are scattered in the lateral direction (step S142 of FIG. 4). If the feature points are determined to be scattered (YES at step S142), a region having a width that is twice of that of the reference rectangle is set as an identification region, with reference to the gravity of the feature points in the lateral direction (step S143). On the other hand, if the feature points are determined not to be scattered (NO at step S142), a region having a width that is three times that of the reference rectangle is set as an identification region, with reference to the gravity of the feature points in the lateral direction (step S144). Specifically, the region setting section 10d determines the width of the identification region on the basis of the distance to the feature points included in the reference rectangle, and the degree of scattering of the feature points in the lateral direction. Thus, when feature points are detected only from a lateral half body of a pedestrian, i.e. when the feature points are not scattered in the lateral direction, an identification region having a large width is set. Accordingly, the region of a pedestrian is reliably encompassed in the identification region.

In this case, in the present embodiment, a fixed margin is vertically given to the reference rectangle to set an identification region (steps S143 and S144 of FIG. 4). Specifically, the region setting section 10d sets the height of the identification region so as to be larger than the height of the reference rectangle. Thus, the region of a pedestrian is reliably encompassed in the identification region in the vertical direction as well.

Further, in the present embodiment, the leg portion range of a pedestrian is specified (step S151 of FIG. 8) and it is determined whether or not the optical flows of the feature points in the leg portion range converge on the FOE (step S152). Based on the results of this determination, a dictionary is selectively used (steps S153 and S154). Specifically, a plurality of dictionaries are stored in the dictionary storage 12, the dictionaries being image patterns expressing the features of individual portions of a moving object. The identifying section 10e specifies a region corresponding to each of the portions of a moving object and, based on the optical flows of the feature points in the region, selectively uses a dictionary on the basis of whether the region is located behind another object and invisible in image.

Specifically, the dictionary storage 12 stores a whole-body dictionary in which patterns corresponding to the whole body of a pedestrian are stored, and an upper-body dictionary in which patterns corresponding to the upper body of a pedestrian are stored. If the optical flows of the feature points in the leg portion region are determined to converge on the FOE (YES at step S152 of FIG. 8), the identifying section 10e determines that the leg portion is invisible and selects the upper-body dictionary (step S153). On the other hand, if the optical flows of the feature points in the leg portion region are determined not to converge on the FOE (NO at step S152), the identifying section 10e determines that the leg portion is visible and selects the whole-body dictionary (step S154). More specifically, the dictionary storage 12 stores an upper-body dictionary that corresponds to image patterns showing the features of an upper body of a pedestrian, and a whole-body dictionary that corresponds to image patterns showing the features of a whole body of a pedestrian. The identifying section 10e specifies the leg portion region of a pedestrian and, if the leg portion region is located behind another object and invisible in image, uses the upper-body dictionary and, if the leg portion region is visible in image, uses the whole-body dictionary, on the basis of the optical flows of the feature points in the leg portion region. Thus, in the event that a pedestrian has an invisible leg portion in image, detection accuracy of the pedestrian is enhanced.

Second Embodiment

Hereinafter is described a second embodiment of the present invention. The second embodiment is different from the first embodiment in the identification region setting process and the pedestrian identification process. The second embodiment is described focusing on the differences in these processes. In the second embodiment, the components identical with or similar to those in the first embodiment are given the same reference numerals for the sake of omitting unnecessary explanation.

Figure 10:
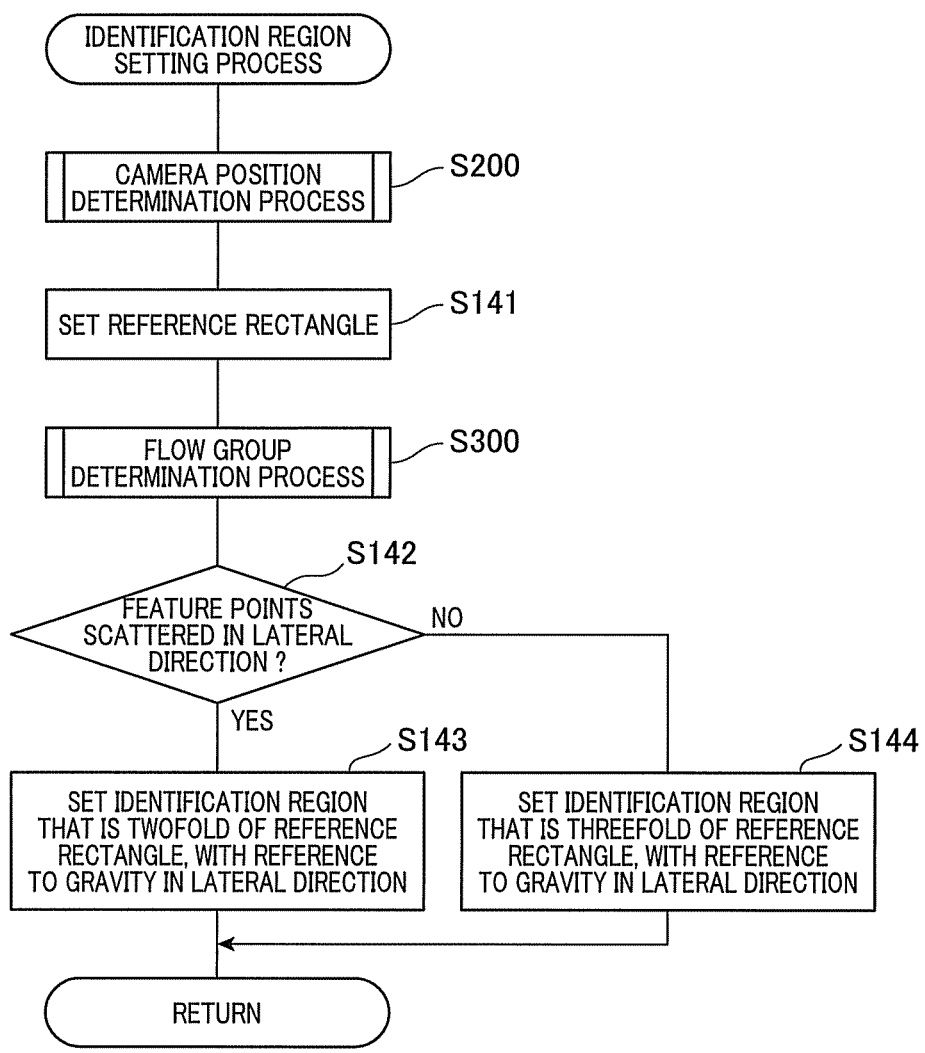
FIG. 10 is a flow diagram specifically illustrating an identification region setting process, according to a second embodiment of the present invention.

FIG. 10 is a flow diagram specifically illustrating an identification region setting process according to the second embodiment. As shown in FIG. 10, the control unit 10 performs a camera position determination process (step S200) and a flow group determination process (step S300). The camera position determination process is performed at a step preceding step S141. The flow group determination process is performed at a step following step S141.

Figure 11A:
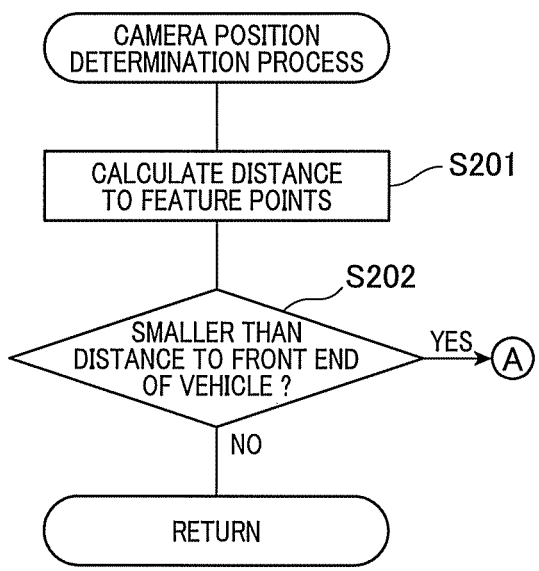
FIG. 11A is a flow diagram illustrating a camera position determination process performed in the identification region setting process.

The camera position determination process is performed as shown in FIG. 11A.

First, at step S201, a distance to feature points is calculated. At this step, the control unit 10 calculates a distance to feature points which are grouped together as showing a moving object. As described above, the distance may be an average value or an intermediate value.

Figure 11B:
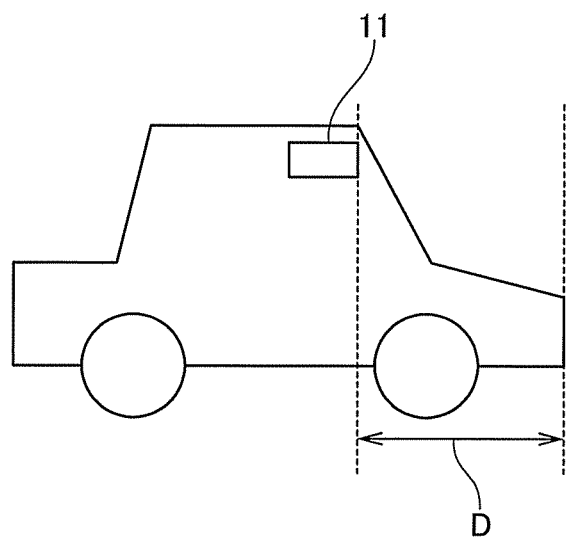
FIG. 11B is an explanatory view specifically illustrating the camera position determination process.

At the subsequent step S202, it is determined whether or not the distance calculated at step S201 is smaller than a distance to the front end of the vehicle. As shown in FIG. 11B, the imaging unit 11 is mounted, for example, near the rearview mirror of the vehicle. Reference D indicates a distance from the imaging unit 11 to the front end of the vehicle. If the distance to the feature points is smaller than the distance D, there is a high probability that the detection is erroneous. Specifically, for example, there is a high probability that a moving object is erroneously detected, or a collision with a moving object has occurred, or the moving object is in the air. If the distance to the feature points is determined to be smaller than the distance to the front end of, the vehicle (YES at step S202), the pedestrian detection process is halted until the next iteration, without performing steps S150 and S160 of FIG. 2. On the other hand, if the distance to the feature points is determined not to be smaller than the distance to the top end of the vehicle (NO at step S202), the camera position determination process is halted until the next iteration and control proceeds to step S141 of FIG. 10.

Figure 12:
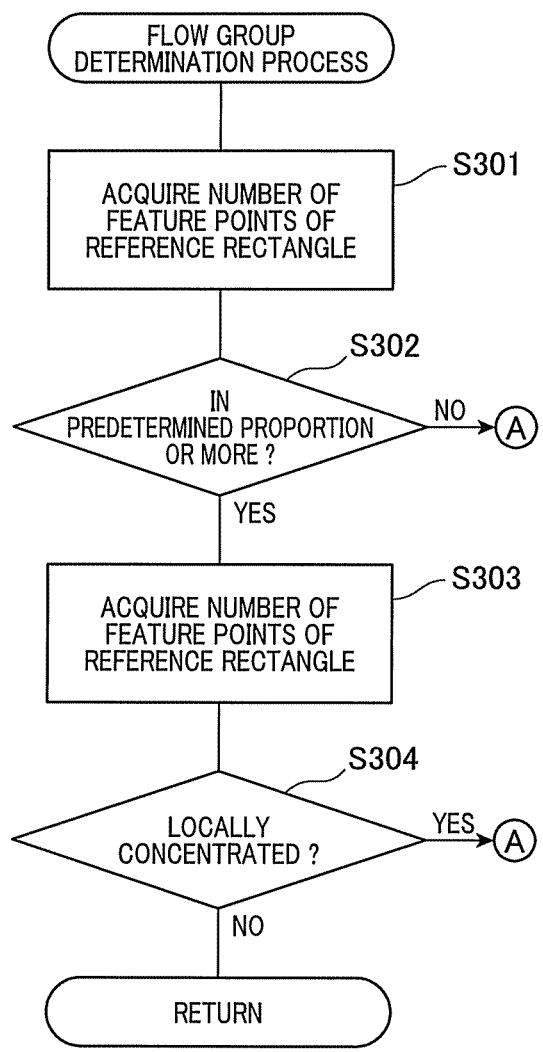
FIG. 12 is a flow diagram specifically illustrating a flow group determination process performed in the identification region setting process.

The flow group determination process is performed as shown in FIG. 12.

First, at step S301, the number of feature points of a reference rectangle is acquired. At this step, the control unit 10 acquires the number of feature points residing inside the reference rectangle that has been set at step S141.

At the subsequent step S302, it is determined whether or not grouped feature points are included inside the reference rectangle in a predetermined proportion or more. This determination is made because, if a reference rectangle is prepared from the distance to the grouped feature points, the grouped feature points will not be necessarily included in the reference rectangle.

Figure 13A:
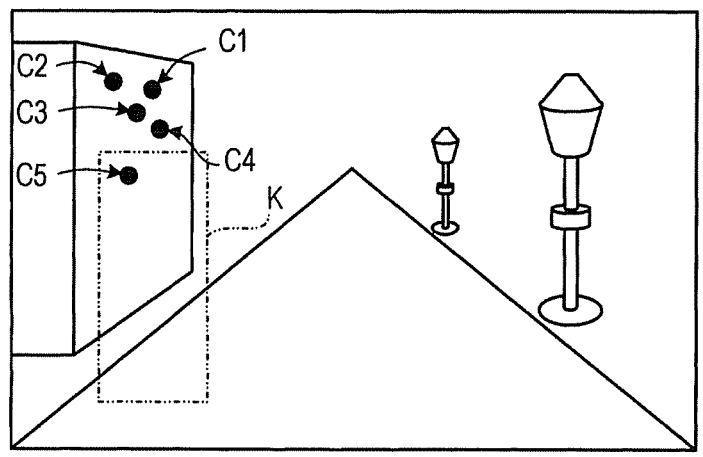
FIGS. 13A to 13C are explanatory views each specifically illustrating the flow group determination process.

This is specifically described. As shown in FIG. 13A, references C1 to C5 indicate feature points grouped together. When the feature points C1 to C5 are detected in an upper part of an image and a reference rectangle K is set on the basis of the distance to the grouped feature points C1 to C5, the reference rectangle K may sometimes be set below the feature points C1 to C5. Here, of the five feature points C1 to C5, only the feature point C5 is included in the reference rectangle K.

Figure 13B:
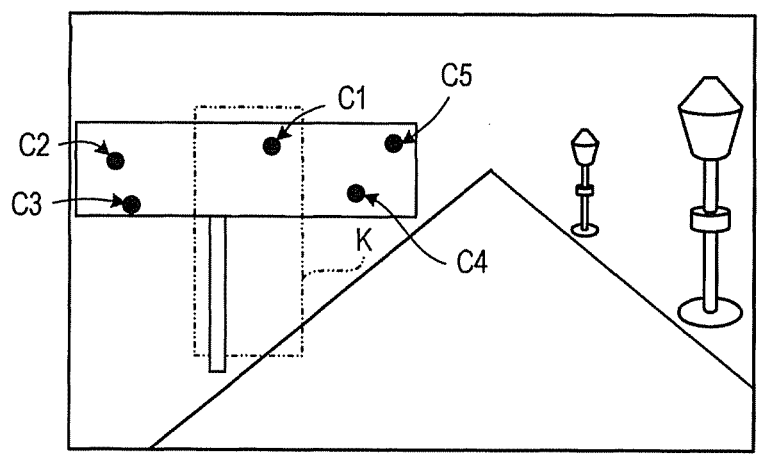

As shown in FIG. 13B, when the feature points C1 to C5 are extracted from an object, such as a signboard, having a large width, the feature points C1 to C5 may sometimes be at positions scattered in the right and left directions of an image. The reference rectangle K here is set at a barycentric position in the right and left directions. Of the five feature points C1 to C5, only the feature point C1 is included in the reference rectangle K.

Specifically, when grouped feature points are not included in a reference rectangle in a predetermined proportion or more, there is a high probability that the detection is erroneous. The "predetermined proportion" may be set on the basis of actual data and may be set, for example, to 40%.

If feature points are determined, at step S302, to be included in a predetermined proportion or more (YES at step S302), control proceeds to step S303. On the other hand, if feature points are determined not to be included in a predetermined proportion or more (NO at step S302), it is determined that there is a high probability of the detection's being erroneous. Then, the pedestrian detection process is halted until the next iteration, without performing steps S150 and S160 of FIG. 2.

At step S303, the positions of feature points in a reference rectangle are acquired. At this step, the control unit 10 acquires the positions of the feature points included in a reference rectangle.

At the subsequent step S304, it is determined whether or not the feature points are locally concentrated. At this step, the control unit 10 determines whether or not the feature points included in the reference rectangle are concentrated on some area of the reference rectangle. Again, this determination is made because there is a high probability that the detection is erroneous.

Figure 13C:
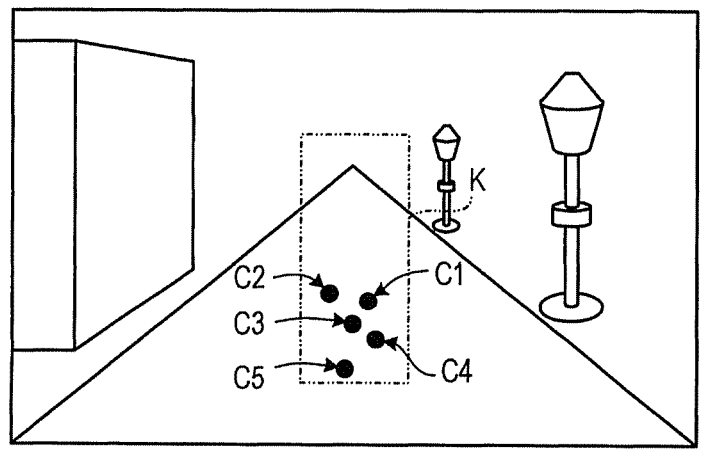

This is specifically described. As shown in FIG. 13C, references C1 to C5 indicate feature points grouped together. When a reference rectangle K is set on the basis of the distance to the feature points, the feature points C1 to C5 are concentrated in the lower half of the reference rectangle K. Naturally, the feature points of the leg portion of a pedestrian are variable to a large extent and accordingly have a low probability of being grouped together. Therefore, the feature points C1 to C5 have a low probability of corresponding to the leg portion of a pedestrian.

In other words, when grouped feature points are locally concentrated, there is a high probability that the detection is erroneous.

If feature points are determined, at step S304, to be locally concentrated (YES at step S304), there is a high probability of the detection's being erroneous. Accordingly, the pedestrian detection process is halted until the next iteration, without performing steps S150 and S160 of FIG. 2. On the other hand, if feature points are determined not to be locally concentrated (NO at step S304), the flow group determination process is halted until the next iteration. Then control proceeds to step S142 of FIG. 10.

As shown in FIG. 14, in the pedestrian identification process of the present embodiment, a determination threshold setting process (step S400) and a lateral direction determination process (step S500) are performed. The determination threshold setting process is performed at a step preceding step S156. The lateral direction determination process is performed if a negative determination is made at step S152.

Figure 15:
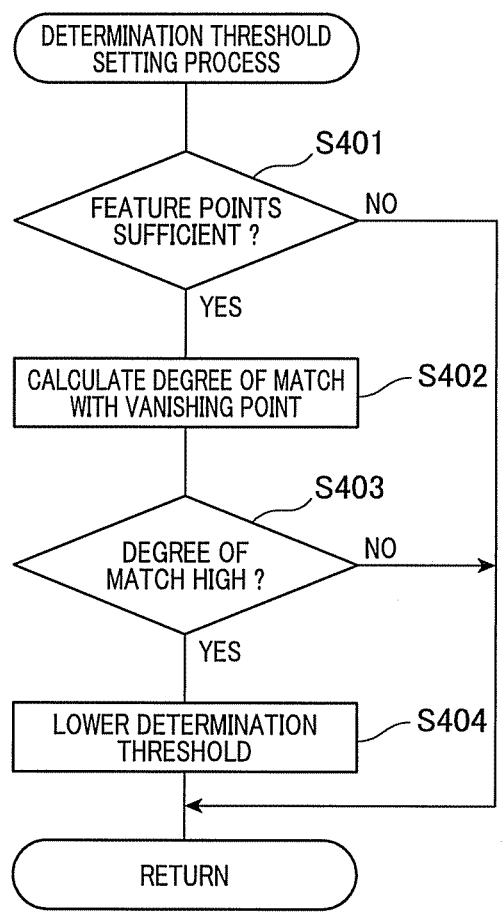
FIG. 15 is a flow diagram specifically illustrating a determination threshold setting process performed in pedestrian identification process.

The determination threshold setting process is performed as shown in FIG. 15. The determination threshold setting process is performed, taking into account that, when an object is detected and the probability of the object's being a moving object is high, a threshold of low value can sufficiently enable matching.

First, at step S401, it is determined whether or not sufficient feature points have been obtained. At this step, the control unit 10 determines whether a reference rectangle includes a sufficient number of feature points grouped together. To this end, the number of feature points that could be sufficient may be determined in advance according to the size of reference rectangle. If the number of feature points is determined to be sufficient (YES at step S401), control proceeds to step S402. On the other hand, if the number of feature points is determined not to be sufficient (NO at step S401), the determination threshold setting process is halted until the next iteration, without performing the subsequent steps. In this case, a normally used determination threshold is set.

Figure 16A:
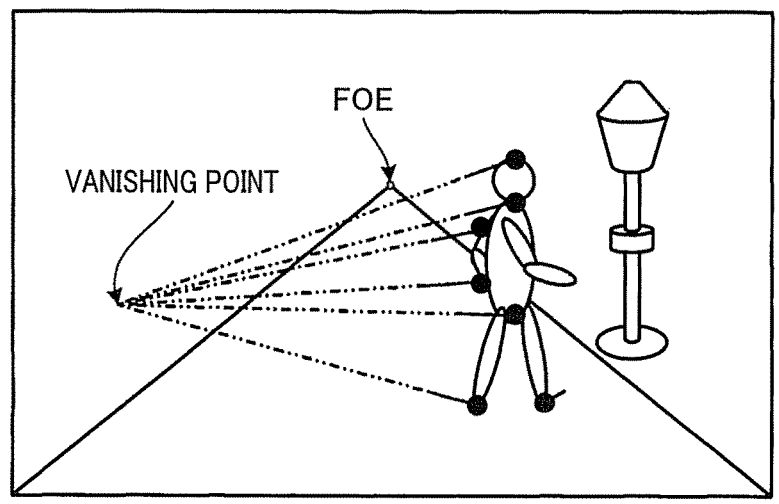
FIGS. 16A to 16C are explanatory views each specifically illustrating the determination threshold setting process.
Figure 16B:
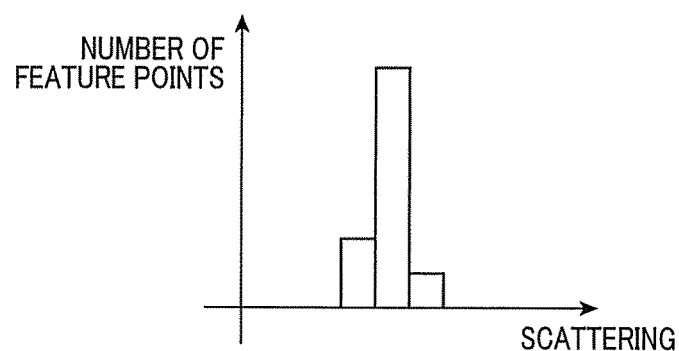
Figure 16C:
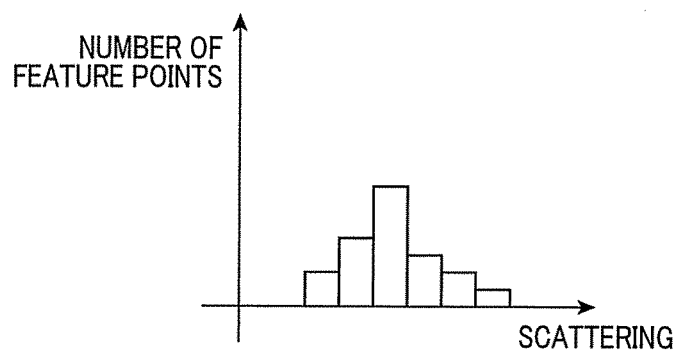

At step S402, a degree of match with a vanishing point is calculated. The optical flows of a moving object converge on a vanishing point. As an example, as shown in FIG. 16A, most of the optical flows of the feature points showing a pedestrian converge on a vanishing point. Let us discuss here, as an example, scattering in the vicinity of a vanishing point. In FIG. 16B, scattering is small and hence the object has a high probability of being a moving object. On the other hand, in FIG. 16C, scattering is large and hence the object has a low probability of being a moving object.

At the subsequent step S403, it is determined whether or not a degree of match is high. For example, a determination in this regard is made by calculating a scattering as described referring to FIGS. 16A to 16C. If a degree of match is determined to be high (YES at step S403), control proceeds to step S404. On the other hand, if a degree of match is determined not to be high (NO at step S403), the determination threshold setting process is halted until the next iteration, without performing step S404.

At step S404, a determination threshold is set to a low value. At this step, the control unit 10 sets a determination threshold, which is used for matching at step S156 of FIG. 14, to a value lower than a normally used value.

Figure 17:
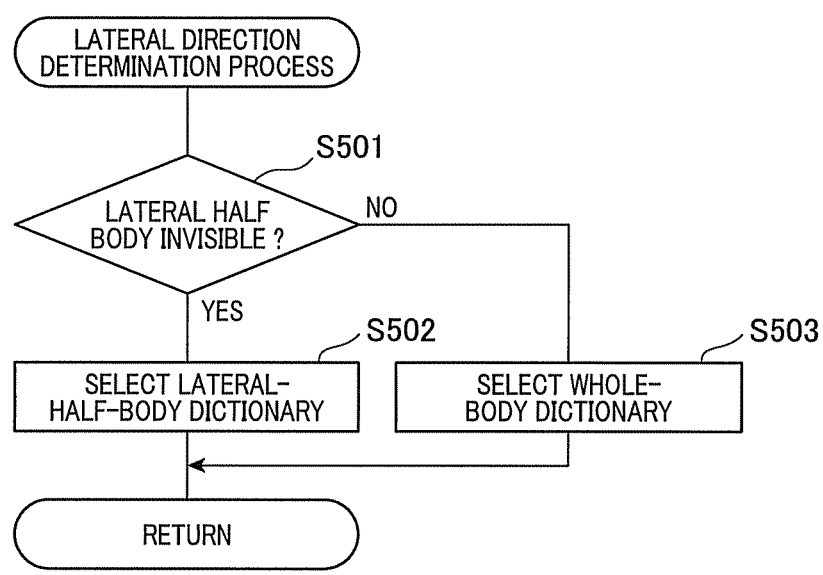
FIG. 17 is a flow diagram specifically illustrating a lateral direction determination process performed in pedestrian identification process.

The lateral direction determination process is performed as shown in FIG. 17. In the foregoing embodiment, as shown in FIG. 8, a leg portion region is specified (step S151), and then it is determined whether or not the optical flows of the feature points corresponding to the leg portion region converge on the FOE (step S152). If the optical flows are determined not to converge on the FOE (NO at step S152), the control unit 10 determines that the leg portion is visible and selects the whole-body dictionary (step S154). In the present embodiment, in addition to the whole-body dictionary, the control unit 10 uses the lateral-half-body dictionary if the lateral half body is invisible in the image.

As shown in FIG. 17, at step S501, it is determined whether or not a lateral half body is invisible in the image. At this step, the control unit 10 determines whether or not there is a stationary object that makes the lateral half body of a pedestrian invisible in the image, on the basis of other grouped feature points or the like. If the lateral half body is determined to be invisible (YES at step S501), the control unit 10 selects the lateral-half-body dictionary at step S502. Then, the lateral direction determination process is halted until the next iteration. On the other hand, if the lateral half body is determined to be visible (NO at step S501), the control unit 10 selects the whole-body dictionary at step S503. Then, the lateral direction determination process is halted until the next iteration.

In the present embodiment as well, the advantageous effects similar to those of the foregoing embodiment can be enjoyed.

In addition, in the present embodiment, the control unit 10 performs the camera position determination process (step S200) in the identification range setting process (see FIG. 10) to calculate a distance to feature points grouped together (step S201 of FIG. 11). Further, when the distance to the feature points is smaller than the distance to the front end of the vehicle (YES at step S202), the control unit 10 determines the detection to be erroneous and halts the pedestrian detection process (see FIG. 2) until the next iteration. Specifically, the pedestrian detection apparatus 1 includes a first interrupting section 10g that interrupts a series of steps of specifying a region of a moving object, on the basis of a distance from the mounting position of the imaging unit 11 to feature points grouped together. Thus, since the first interrupting section 10g interrupts the series of steps based on the feature points having a high probability of being erroneously detected, the entire processing speed is enhanced.

Further, in the present embodiment, the control unit 10 performs the flow group determination process (step S300) in the identification region setting process (see FIG. 10) to acquire the number of feature points included in a reference rectangle and determine whether or not grouped feature pints are included in the reference rectangle in a predetermined proportion or more (step S302). If grouped feature points are not included in the reference rectangle in a predetermined proportion or more (NO at step S302), the control unit 10 determines the detection to be erroneous and halts the pedestrian detection process (see FIG. 2) until the next iteration. Also, the control unit 10 acquires the positions of the feature points included in the reference rectangle (step S303) and determines whether or not the grouped feature points are concentrated on an area in the reference rectangle (step S304). If the feature points grouped together are concentrated on an area in the reference rectangle (YES at step S304), the control unit 10 determines the detection to be erroneous and halts the pedestrian detection process (see FIG. 2) until the next iteration. Specifically, the pedestrian detection apparatus 1 includes a feature point interrupting means 10h that interrupts a series of steps of specifying a range of a moving object, on the basis of at least either of the number and the positions of grouped feature points included in a reference rectangle that has been set by the rectangle setting section 10c. Thus, since the feature point interrupting means 10h interrupts the series of steps based on the feature points having a high probability of being erroneously detected, the entire processing speed is enhanced.

Incidentally, the foregoing first and second interrupting means 10g and 10h and the threshold setting sections 10i are functionally realized by the control unit 10 through performance. These sections 10g, 10h and 10i are shown in FIG. 1.

Further, in the present embodiment, the control unit 10 performs the determination threshold setting process (step S400) in the pedestrian identification process (see FIG. 14) to lower a determination threshold (step S404) if the number of feature points included in a reference rectangle is sufficient (YES at step S401 of FIG. 15) and if the degree of match with the vanishing point of the feature points is high (YES at steps S402 and S403). Specifically, the pedestrian detection apparatus 1 includes a threshold setting section 10i that sets a threshold used for matching performed by the specifying section 10f to a value smaller than a normally used value, on the basis of grouped feature points included in a reference rectangle that has been set by the rectangle setting section 10c. Thus, when the grouped feature points have a high probability of being a pedestrian, the threshold used for matching is set to a small value. Accordingly, a pedestrian can be reliably specified without fail.

In the present embodiment, the control unit 10 performs the lateral direction determination process (step S500) in the pedestrian identification process (see FIG. 14) to determine whether or not a lateral half body is invisible in image (step S501 of FIG. 17). If the lateral half body is invisible (YES at step S501), the control unit 10 selects the lateral-half-body dictionary (step S502). If the lateral half body is visible (NO at step S501), the control unit 10 selects the whole-body dictionary. Thus, in the event that a lateral half body of a pedestrian is invisible in the image, the pedestrian can be appropriately specified.

The present invention is by no means limited to the foregoing embodiments but may be implemented in various modes, as far as the modes do not depart from the technical scope of the invention.

(a) In the second embodiment described above, the control unit 10 uses the lateral-half-body dictionary that shows the features of a lateral half body of a pedestrian, as well as the upper-body dictionary and the whole-body dictionary. Alternatively, the control unit 10 may use only the lateral-half-body dictionary and the whole-body dictionary, without using the upper-body dictionary.

(b) In the foregoing embodiments, the dictionary storage 12 includes the upper-body dictionary that shows the features of the upper body of a pedestrian, the lateral-half-body dictionary that shows the features of a lateral half body of a pedestrian, and the whole-body dictionary that shows the features of the whole body of a pedestrian. In this regard, the direction of movement of a pedestrian can be grasped from the optical flows of the feature points in a head portion or a trunk portion of a pedestrian. Therefore, the control unit 10 may selectively use a dictionary that has been prepared on a direction basis, which takes account of the direction of movement of a pedestrian. Specifically, the dictionary storage 12 may store additionally a pedestrian-rightward dictionary that shows image patterns of the features of a pedestrian who moves rightward, and a pedestrian-leftward dictionary that shows image patterns of the features of a pedestrian who moves leftward. In this case, the identifying section 10e may specify the direction of movement of a pedestrian and, if the direction of movement is rightward, may use the pedestrian-rightward dictionary and, if the direction of movement is leftward, may use the pedestrian-leftward dictionary. Thus, the accuracy of detection is further enhanced.

(c) The descriptions in the foregoing embodiments are focused on the detection of a pedestrian. However, the present invention may be applied to the detection of other moving objects, such as vehicles or animals.

The present invention may be embodied in several other forms without departing from the spirit thereof. The embodiment and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An apparatus for detecting a moving object, comprising:
an imaging unit imaging repeatedly at intervals a region to be detected of a moving object;
a dictionary storage storing, as a dictionary, image patterns indicative of features of the moving object wherein the dictionary is prestored; and
a control unit, wherein the control unit is configured to include:
an extracting section extracting feature points indicative of a position of an object in the images, based on data of the images repeatedly imaged by the imaging unit;
a calculating section calculating an optical flow of the feature points, based on the feature points in the images extracted time sequentially by the extracting section;
a rectangle setting section grouping the feature points of the moving object and setting a reference rectangle encompassing the grouped feature points, based on the optical flow calculated by the calculating section;
a region setting section setting an identification region encompassing both a region showing the moving object and the reference rectangle;
an identifying section identifying the moving object in the identification region, using the dictionary stored in the dictionary storage; and
a specifying section specifying the region occupied by the moving object, based on results identified by the identifying section and an image region having the highest degree of match with the dictionary;
wherein:
the rectangle setting section determines a height of the reference rectangle based on a distance to the grouped feature points and a height of the moving object virtually set;
the rectangle setting section determines a width of the reference rectangle based on the height of the reference rectangle;
the region setting section determines a width of the identification region based on distances to the feature points encompassed by the reference rectangle and a degree of lateral scattering;
the region setting section sets the height of the identification region which is larger than the height of the reference rectangle;
the dictionary storage stores therein, as the dictionary, a plurality of dictionaries showing the image patterns indicative of the features of each part of the moving object; and
the identifying section identifies a region corresponding to each of the parts of the moving object, determines whether or not the identified region is behind other objects, and selectively uses the dictionaries in the dictionary storage, based on the optical flow of the feature points in the region and on whether the identified region is behind the other objects.

2. An apparatus for detecting a moving object, comprising:
an imaging unit imaging repeatedly at intervals a region to be detected of a moving object;
a dictionary storage storing, as a dictionary, image patterns indicative of features of the moving object wherein the dictionary is prestored; and
a control unit, wherein the control unit is configured to include:
an extracting section extracting feature points indicative of a position of an object in the images, based on data of the images repeatedly imaged by the imaging unit;
a calculating section calculating an optical flow of the feature points, based on the feature points in the images extracted time sequentially by the extracting section;
a rectangle setting section grouping the feature points of the moving object and setting a reference rectangle encompassing the grouped feature points, based on the optical flow calculated by the calculating section;

a region setting section setting an identification region encompassing both a region showing the moving object and the reference rectangle;

an identifying section identifying the moving object in the identification region, using the dictionary stored in the dictionary storage;

a specifying section specifying the region occupied by the moving object, based on results identified by the identifying section and an image region having the highest degree of match with the dictionary;

wherein:

the rectangle setting section determines a width of the reference rectangle based on a height of the reference rectangle;

the region setting section determines a width of the identification region based on distances to the feature points encompassed by the reference rectangle and a degree of lateral scattering;

the region setting section sets the height of the identification region which is larger than the height of the reference rectangle;

the dictionary storage stores therein, as the dictionary, a plurality of dictionaries showing the image patterns indicative of the features of each part of the moving object; and the identifying section identifies a region corresponding to each of the parts of the moving object, determines whether or not the identified region is behind other objects, and selectively uses the dictionaries in the dictionary storage, based on the optical flow of the feature points in the region and on whether or not the identified region is behind other objects.

* * * * *

UNITED STATES PATENT AND TRADEMARK OFFICE
CERTIFICATE OF CORRECTION

PATENT NO. : 9,852,334 B2
APPLICATION NO. : 14/104060
DATED : December 26, 2017
INVENTOR(S) : Kunihiro Goto et al.

It is certified that error appears in the above-identified patent and that said Letters Patent is hereby corrected as shown below:

On the Title Page

(73) Assignee, "DENSO CORPORATION, Nagoya-shi (JP)" should be --DENSO CORPORATION, Kariya-city, Aichi-pref. (JP)--.

Signed and Sealed this
Twenty-seventh Day of March, 2018

Andrei Iancu
*Director of the United States Patent and Trademark Office*